Oct. 6, 1925.

A. BÖTTCHER 1,556,407

VALVE GEAR FOR PIPES WITH SEVERAL BRANCHES

Filed Sept. 1, 1921

INVENTOR

Patented Oct. 6, 1925.

1,556,407

UNITED STATES PATENT OFFICE.

ALFRED BÖTTCHER, OF DUSSELDORF, GERMANY.

VALVE GEAR FOR PIPES WITH SEVERAL BRANCHES.

Application filed September 1, 1921. Serial No. 497,796.

(GRANTED UNDER THE PROVISIONS OF THE ACT OF MARCH 3, 1921, 41 STAT. L., 1313.)

*To all whom it may concern:*

Be it known that I, ALFRED BÖTTCHER, a citizen of Germany, and residing at Dusseldorf, Germany, have invented certain new and useful Improvements in Valve Gear for Pipes with Several Branches (for which I have filed application in Germany, June 13, 1916, No. 318,557), of which the following is a specification.

My invention relates to improvements in multiple valves, and more particularly in slide valves provided between tubular members for directing the flow of a fluid from a tubular member located at one side of the valve to any one of several located at the other side of the valve.

One of the objects of the improvements is to provide a valve which is simple in construction, and in which the fluid follows a straight path or a smooth curve. With this object in view my invention consists in connecting the tubular member or members located at one side of the valve with the slide and shifting the same together with the slide relatively to the valves located at the other side of the valve for connecting the desired tubular members with each other.

For the purpose of explaining the invention an example embodying the same, has been shown in the accompanying drawing, in which the same letters of reference have been used in all the views to indicate corresponding parts. In said drawing Fig. 1 is an end view seen from the right in Fig. 2 and showing the improved system of the invention and Fig. 2 is a side view of Fig. 1 partially in section.

Figure 1:
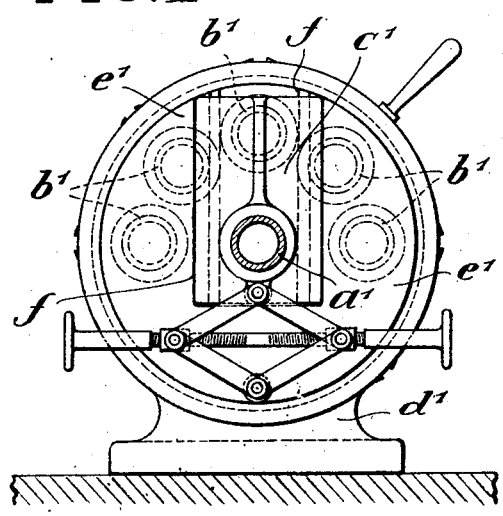
Figure 2:
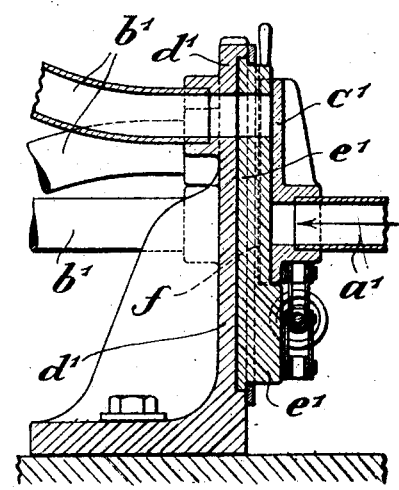

In the example shown in Figures 1 and 2 the tubular members ($b^1$) are disposed along a circle and secured to a circular plate ($d^1$). On the plate ($d^1$) a disk ($e^1$) is mounted to rotate on which a slide ($c^1$) is slidable in suitable guide ways ($f$). To the slide ($c^1$) the tubular member ($a^1$) is secured. For connecting the tubular member ($a^1$) with one of the members ($b^1$), the disk ($e^1$) is rotated relatively to the plate ($d^1$) and the slide ($c^1$) is shifted from the position shown in the figures outwards and with the member ($a^1$) in line with the desired tubular member ($b^1$). If thereafter it is desired to connect the member ($a^1$) with another one of the members ($b^1$) only rotary movement of the disk ($e^1$) is necessary. It will be understood that also in this case the member ($a^1$) at the end connected to the slide ($c^1$) is made from flexible material.

I claim:

A valve system, comprising two members in tightening and rotary sliding engagement with each other and one of them stationary and formed with a plurality of apertures and the other one rotatable and formed with a single aperture located in position for being brought in line with the apertures of stationary member, a slide mounted on said rotatable member and having an aperture adapted to be brought in line with the aperture of the rotatable member, and tubular members respectively secured to the stationary member and slide and in line with the apertures thereof, the tubular member secured to the slide being constructed to follow the displacement of the slide and rotatable member.

In testimony whereof I hereunto affix my signature.

ALFRED BÖTTCHER.